Patented June 6, 1944

2,350,524

UNITED STATES PATENT OFFICE 2,350,524

AZO PIGMENT DYESTUFF AND COATING COMPOSITION

Grady M. O'Neal, Chicago, Ill., assignor to The Sherwin-Williams Company, Cleveland, Ohio, a corporation of Ohio No Drawing. Application March 17, 1943, Serial No. 479,497

22 Claims. (Cl. 106—219)

This invention relates to azo pigment dyestuffs of both the salt and non-salt forms and of both lake and non-lake forms, and to coating compositions made therefrom, and in particular to such azo pigment dyestuffs having water-insoluble metallic soap associated therewith. More particularly, the invention involves retention of salt electrolyte with the soap-pigment compositions.

The principal object of this invention is to make improved azo pigment dyestuff compositions and coating compositions made therefrom, such as inks, paints, enamels, and the like, by associating and retaining salt electrolyte with the pigment, or the soap, or both during the manufacture of either the soap or the azo pigment dyestuff, or both. This may be accomplished in a variety of ways depending upon the particular procedure which it is desired to employ in making the materials.

In my cofiled application, Serial No. 479,493, I have disclosed and claimed a generic invention based upon the discovery that water-insoluble, rosinic-fatty type acid, metallic soaps possess new and valuable properties in combination with azo pigment dyestuff. In my cofiled applications, Serial Nos. 479,495, and 479,496, I have disclosed and claimed two wet processes by means of which the said generic invention can be advantageously employed to produce azo pigment dyestuffs of the non-lake type and the lake type. While the two wet processes of the last mentioned applications are of great value and demonstrate outstanding advantages in certain pigment manufacturing operations, they possess a number of characteristics which tend to limit their fields of usefulness. For example, neither of these procedures is readily applicable to treating the alkali metal salt-forms of azo pigment dyestuffs.

In my cofiled application, Serial No. 479,498, I have disclosed and claimed a dry process, and the product thereof, for combining rosinic fatty type acid, metallic, soap powders with pigment powders. In my cofiled applications, Serial Nos. 479,494 and 479,499, I have disclosed and claimed certain specific types of rosinic-fatty type acid metallic soap powders useful in carrying out the invention of my application, Serial No. 479,498, mentioned above.

In each of the several applications referred to, mention is made of a discovery involving the use of salt electrolyte to bring about certain improvements in azo pigment dyestuffs and coating compositions made therefrom, and in each of these applications certain of the claims have been directed to the adaptation of this discovery to the respective inventions of those applications.

The present application is intended to cover the use of salt electrolyte broadly in the processes and with products of my various other applications, as well as in still other processes and with other products not described in said applications.

As indicated in the foregoing discussion, the principal object of this invention is to improve azo pigment dyestuffs by a change in the prior art processes which change requires no additional operation and which, according to one embodiment of my invention, involves the elimination of a conventional prior art operation.

A more specific object of the invention is to produce azo pigment dyestuffs having improved wetting properties toward vehicles for coating compositions, bettered dispersion, and lessened emulsification tendencies when incorporated into a vehicle.

It is generally the object of the present invention to associate azo pigment dyestuff, salt electrolyte, and water-insoluble metallic soap at any stage prior to completely dispersing the azo pigment dyestuffs into a non-aqueous liquid vehicle for a coating composition.

Various other objects and advantages will be present from the following detailed description of the invention.

Azo pigment dyestuffs, as is well known, are produced by diazotizing an amine and coupling it with a suitable color-forming component. This formed azo compound may or may not be suitable for use as a pigment at this point. In the latter case, a further processing, as by converting to a more insoluble or stable form, is necessary. The pigment dyestuff resulting from the final processing by this well known procedure is then filtered, giving a pigment dyestuff press cake or pulp. A procedure is normally employed at the end of the filtering operation to wash the pigment press cake free from soluble salts, alkali, or acid. In the case of certain azo pigment dyestuffs, the accomplishment of this aim is rather lengthy and drawn out. The idea behind the washing step, and the one generally held throughout the industry, is that an acid or alkaline press cake containing soluble salts, when further processed, results in coating compositions which are difficult to grind or disperse into a vehicle and show a marked tendency to set-up, skin, and generally give poor working properties. However, I have found, surprisingly enough, that under certain conditions this previous concept or notion is not entirely true; rather, the opposite is true when a water-insoluble metal soap is present. I do not mean to say that the conditions of acidity and alkalinity in a pigment press cake or pulp do not have a considerable effect upon the properties of a coating composition; but I have found that salt electrolyte can be present to great advantage in giving improved pigment coating compositions when water-insoluble metallic soap is present. The presence of salt electrolyte produces some slight improvement in the wetting and dispersion properties of an azo pigment dyestuff having no such soap associated therewith. However when a water-insoluble metal soap and salt electrolyte are present with an azo pigment dyestuff in the dispersion into a liquid vehicle and in the resulting composition, a marked improvement has been observed due to the intentional presence of salt electrolyte. And, further, with an azo pigment dyestuff which has salt electrolyte and a water-insoluble metallic soap of a rosinic-fatty type acid nature associated therewith, improvements of a very marked degree are obtained. In fact, the use of salt electrolyte and rosinic-fatty type acid soap permits the manufacture of an entirely new series of azo pigment dyestuffs which have hitherto been desired but unattained. Not only do these new azo pigment dyestuffs possess all the tinctorial properties of the old type of pigments, but, in addition, the coating compositions made therefrom possess one or more of these improvements: improved or easier dispersion of the pigment into a vehicle; bettered working properties, such as softer body, outstanding flow, and decreased set-up; enhanced film gloss; and, in certain instances, greater lithographic breakdown resistance.

In printing, good ink flow is of great value because inks which flow readily from the fountain to the inking rollers enable impressions to be made more smoothly and rapidly. Also, in other types of coating compositions, the user is enabled to incorporate higher percentages of pigment into a given vehicle and still maintain the flow properties of the old type of coating composition. In addition, the feature of incorporating higher percentages of pigment into a given vehicle enables a manufacturer of coating compositions, such as one making use of "toner base" inks, to have more freedom in formulating a specific ink composition. In the manufacture of inks, lessened set-up and excellence of body flow, aside from the economic factor, facilitate the removal of a "toner base" ink from its original container. Less loss by skinning and adhesion to the container occurs, less labor is employed, and other economic factors are favorable.

The term "azo pigment dyestuff" includes both the salt and non-salt forms. Such pigments may be extended, as by substrata or diluents, with organic or inorganic materials to obtain various effects. Organic materials commonly employed are various soaps, such as the rosinates, para, and fatty acid types. Inorganic materials are, for example, blanc fixe, aluminum hydrate, aluminum phosphate, magnesium carbonate, and others. Substrata are generally present in sizable amounts, upwards by weight of 10 parts to as high as 100 parts of soap-forming acid to 100 parts of pigment, and occasionally in even greater amounts. Azo pigment dyestuffs containing the various extenders in such relatively large amounts are known as lakes, but for the purposes of the present invention, lake-forms are considered as those having at least 10 parts of soap-forming acid to 100 parts of pigment, and non-lake forms are those having less or no extender. This definition is made because the art is not definite on the point.

The advantages of using a water-insoluble metallic soap may be accomplished by producing an azo pigment dyestuff which embodies within itself the said soap, with or without said electrolyte. However, the soap may be used alone as a separate ingredient in compounding an ink or a coating composition where salt electrolyte is also present. Salt electrolyte also may be used as a separate ingredient in compounding the pigment, the soap, and vehicle. Thus, the azo pigment dyestuff, as one ingredient, may be mixed with the soap, as another ingredient, and salt electrolyte, as a third ingredient, to form a pigment composition. This composition, then may be used as a "pigment" in a formulation for an ink or a coating composition, without departure from conventional commercial practice.

The scope of the term "soap" is not clearly defined in the technical literature, and the term is loosely and often improperly employed. Since the present invention makes use of soaps, and is particularly beneficial when two special classes of soaps are employed together, I have chosen to define these special classes of soaps by defining the acids from which they are derived, and have identified the two classes respectively by the terms "rosinic acid" and "fatty type acid."

By the term "rosinic acid," as used in this application, I intend to include rosin and abietic acid; modifications of rosin, such as heat-modified rosin and solvent-extracted rosin; chemical derivatives of rosin, such as hydrogenated rosin or abietic acid; the complex soap-forming acids resulting from the condensation product of rosin or abietic acid with unsaturated aliphatic acids having up to, but not more than, two carboxyl groups, as described hereinafter; and other chemical derivatives of rosin or abietic acid. A special class of these chemical derivatives of rosin and abietic acid is covered in my cofiled application, Serial No. 479,499, wherein unsaturated aliphatic acids (including their anhydrides and their esters) containing up to, but not more than, two carboxyl groups are condensed with rosin or abietic acid by means of a diene or polymerization-condensation type of synthesis. In that application it has been shown that the procedural route for obtaining these desired complex acids is capable of wide variation. In one example, a typical ethylene dicarboxylic acid, in the form of its anhydride, is condensed with rosin to give the complex soap-forming acid directly. In a second example, a typical mixture of unsaturated, long chain, aliphatic, monocarboxylic acids that are common in drying oils is condensed (the glyceride esters of these acids being employed in this instance) with rosin to give a condensation-polymer glyceride ester, this ester being then saponified with alkali to give the desired complex soap-forming acids. It is possible to use other ester forms of these unsaturated aliphatic acids in effecting their condensation with rosin or abietic acid, and it is not necessary that these esters be those of unsaturated, long chain, aliphatic, monocarboxylic acids. For example, it is possible to form the identical maleic acid-abietic acid condensation product obtained by reacting maleic anhydride with abietic acid by condensing, instead, the dimethyl ester of maleic acid with abietic acid to give the ester adduct, and then subsequently saponifying the ester adduct with alkali. All of this is well known. In the case of linseed oil, which was employed in the second example just referred to and which is illustrative of the drying oils, two unsaturated aliphatic acids are mainly present—linolic or 9:12-octadecadienoic acid, and linolenic or 9:12:15-octadecatrienoic acid. Linolic acid is an unsaturated, monocarboxylic acid of the general type, $C_nH_{2n-3}COOH$; and linolenic acid is an unsaturated monocarboxylic acid of the general type, $C_nH_{2n-5}COOH$. Hence it is seen that a large number of complex soap-forming acids capable of forming water-insoluble metallic soaps for the purposes of this invention, are available. All of these various types of simple and complex acids are contemplated by the use of the term "rosinic acid" in this specification and in the claims which follow.

The term "fatty type acid," for the purposes of the present invention, contemplates: (1) the various α,β-unsaturated aliphatic acids having up to, but not more than, two carboxyl groups, such as maleic acid, crotonic acid, acetylene dicarboxylic acid, citraconic acid, and the like, which are capable of being condensed with rosin or abietic acid by the Diels-Alder reaction (described hereinafter, and also in more detail in my cofiled application Serial No. 479,499); (2) the saturated and unsaturated soap-forming aliphatic acids, which have at least 8 carbon atoms including a carboxyl group carbon in an open carbon chain, such as caprylic acid, ricinoleic acid, oleic acid, linolic acid, linolenic acid, palmitic acid, and the like; and (3) the soap-forming naphthenic acids, defined hereinafter, and others of a cycloaliphatic nature, each carboxyl group of which is attached to the cyclic carbon chain through at least one intermediate carbon atom so that each carboxyl group is part of an aliphatic side chain of at least two carbon atoms. By this last mentioned limitation, I intend to include in this third class of fatty type acids those cycloaliphatic compounds, such as naphthenic acids, in which the carboxyl group is part of an aliphatic radical having at least two carbon atoms (including the carboxyl group carbon) and is not attached directly to a carbon atom of a cyclic carbon chain, and to exclude and differentiate from such compounds as the "rosinic acids," defined above, in which the carbon atom of the carboxyl group of the rosin or abietic acid is attached directly to a carbon atom of a cyclic carbon chain.

It is well known that many of the fatty type acids in group (2) in the preceding paragraph, both saturated and unsaturated, are found as mixtures in vegetable oils and animal fats, principally in the form of glycerides. Among the vegetable oil acids which are useful in the present invention, for example, are those from the oils of perilla seed, soya bean, sunflower seed, corn, rapeseed, and linseed. A typical analysis of perilla oil acids, to illustrate one class, is as follows:

| Nature of acid: | Percentage |
|---|---|
| Oleic | 4.0–10.5 |
| Linolic | 33.0–44.0 |
| Linolenic | 44.0–49.0 |
| Palmitic (substantially) | 6.5– 8.0 |

The term "fatty type acid" includes in group (1) of the above definition certain short chain acids, such as maleic acid, which are not "soap-forming" acids, as the latter term is generally understood. I wish to make it clear, therefore, that such acids, since they are not alone truly "soap-forming," when reacted to form a metal salt, are not contemplated by the expression "soap of a fatty type acid." However, they are "soap-forming" acids when chemically combined with rosin, and, therefore, they are intended to be included as members of the group of "fatty type acids" useful for the purposes of the present invention. When chemically combined with rosin and suitably reacted with a metal, they enter into the formation of a soap which is both rosinic and fatty type in nature and which is embraced by the broad terms "rosinic-fatty type acid soap" and "soap of both a rosinic acid and a fatty type acid," as these terms are employed in this and my related applications referred to above.

Naphthenic acids are secured from petroleum during refining and are defined by "Richter's Organic Chemistry," vol. II (1939), p. 64, essentially as follows: They consist of saturated monocyclic acids of the general formula $C_nH_{2n-2}O_2$, which have been found to be alkylated carboxylic acids of the cyclopentane series up to $C_{12}H_{22}O_2$; of two paraffin-carboxylic acids $C_6H_{12}O_2$ and $C_7H_{14}O_2$; and some bicyclic compounds of the general formula $C_nH_{2n-4}O_2$ ranging from $C_{13}H_{22}O_2$ to $C_{22}H_{40}O_2$.

The term "salt electrolyte" comprehends generally those salts which are water-soluble and substantially neutral when ionized in aqueous solution, in particular the water-soluble salts of the alkali and the alkali-earth metals. While salts of the strong mineral acids, such as hydrochloric and nitric, are most usually illustrated in the following examples, others have been employed, such as salts of sulfuric acid or salts of weak organic acids (formic, acetic, citric, oxalic, and others). Also cations other than the alkali and alkali-earth metals have been used as salts of a variety of acids, such cations being iron, lead, zinc, manganese, copper, and others. In general, the choice of the best specific salt electrolyte is best determined experimentally.

The term "rosinic-fatty type acid," as used in connection with the present invention, contemplates the inclusion of (a) a physical mixture of one or more rosinic acids with one or more soap-forming fatty type acids; (b) chemically combined rosinic acid and fatty type acid, such as the rosin-maleic acid condensation product later described which is a single compound which is both rosinic acid and fatty type acid as defined in this specification; (c) mixtures of (b) with a soap-forming fatty type acid; (d) mixtures of (b) with a rosinic acid; and (e) mixtures of (b) with (a).

The present invention may best be understood by considering the following specific examples, in which all parts are given by weight:

EXAMPLE 1

This example is taken from my cofiled application, Serial No. 479,495, referred to above.

GRAPHIC RED PIGMENT—*The calcium salt of the coupling of 2-naphthylamine-1-sulfonic acid with 2-naphthol. See Schultz, "Farbstofftabellen" (1931), No. 219.*—Prepare 485 parts of water containing well slurried pigment pulp, still wet from the forming process and in the amount of 17.5 parts (dry content). If desired, 0.39 part of the condensation product of naphthalene sulfonic acid and formaldehyde, dissolved in 10 parts of water, may be added to assist in the dispersion of the pigment in water. Then add 0.39 part of perilla oil fatty acids, as the sodium salts in a 10% aqueous solution. To this add 0.37 part of barium chloride ($BaCl_2.2H_2O$) dissolved in 10 parts of water. Then add 0.78 part of a condensation product of approximately 1 part of maleic anhydride and 6.8 parts of E wood rosin, as the sodium salt in a 10% aqueous solution. Then add 0.62 part of barium chloride ($BaCl_2.2H_2O$) in 10 parts of water. This point in the procedure is designated "stage A," for reasons appearing below.

Up to this point, it is seen that one insoluble soap is built upon another. A special excess of 2.0 parts of barium chloride ($BaCl_2.2H_2O$) in 20 parts of water is then added, followed by 15 minutes agitation. Then filter, and dry without washing. The dried pigment is designated "product B."

During the above process, the temperature of the slurry is preferably kept at 50° to 55° C. While the temperature is not critical, it does affect the rate of the precipitation reactions. It is desirable to maintain, for standardized products, a rather close control of temperature, because a deviation from a prescribed temperature in some cases affects the value of the color. The preferred temperature in this example has been found to give the particular results which applicant desires, and need be followed closely only for the purpose of obtaining reproducible results. After each addition, an agitation period of 5 minutes is generally satisfactory for thorough mixing, except that, at the end, 15 minutes of mixing is desirable to insure completion of the reactions and other phenomena.

In "product B," salt electrolyte is present and includes a part of the salt last added and also some sodium chloride resulting from the sodium of the water-soluble soaps, plus any salt electrolyte which may have come into the original pigment slurry as a result of any incomplete washing of the pigment after its formation. The total acid content of the soaps is 6.7% of the original pigment, being 2 parts of rosinic acid to 1 part fatty type acid. The salt electrolyte retained is variable with the character of the procedure, especially the filtration.

The following comparison shows particularly the advantages of salt electrolyte in the pigment. At stage A, above referred to, the pigment is filtered, thoroughly washed, and dried, giving product A. Then product B, resulting from this example as completed, is compared with product A.

Two inks were prepared having 20 parts of pigment to 24 parts of No. 0 regular litho varnish (a bodied linseed oil), called, respectively, "ink A" and "ink B," from the pigments used therein.

*Ink body.*—Ink B shows a radical improvement over ink A prepared from the pigment containing no salt electrolyte, in terms of body-softness and flow.

*Lithographic breakdown resistance.*—A very marked improvement is shown by ink B over ink A prepared from the pigment containing no salt electrolyte.

EXAMPLE 2

This example is taken from my cofiled application, Serial No. 479,496, referred to above.

GRAPHIC RED PIGMENT—*Barium salt of the coupling of 2-naphthylamine-1-sulfonic acid with 2-naphthol.* (See Schultz, "Farbstofftabellen" (1931), No. 219).—Into 300 parts of water, place 8.5 parts of sodium hydroxide and 43.9 parts of 2-naphthylamine-1-sulfonic acid (98.5% purity). With gentle warming, stir to solution. Cool to 0° C. by means of ice addition. Then add 57 parts of 28% by weight hydrochloric acid. Diazotize at 0° to 2° C. with 13.8 parts of sodium nitrite to prepare a diazo. Separately dissolve 1.2 parts of sodium carbonate (anhydrous) in 150 parts of water, and to this add a solution of 225 parts of water, 8.9 parts of sodium hydroxide, and 27.9 parts of 2-naphthol to form the alkaline color-component solution. With the latter at 20° C., add to it the prepared diazo, thus striking the dyestuff, which is now present as the acid-form in the presence of sodium ion in a medium at about 13° C. This is referred to as "the strike." To the strike at 13° C., add the following three aqueous soap solutions:

(a) 7.2 parts of WW wood rosin, as the sodium salt in a 10% solution;

(b) 7.2 parts of a maleic acid-rosin condensation product (prepared by condensing approximately 1 part of maleic anhydride with 6.8 parts of E wood rosin), as a sodium salt in a 10% solution; and (c) 7.2 parts of crude naphthenic acids, as the sodium salts in a 10% solution;

and then dilute with cold water to a 100% volume increase.

Separately prepare a solution at 70° to 80° C. of 1800 parts of water and 17.8 parts of barium chloride ($BaCl_2.2H_2O$). Add the soap-containing strike slowly, as required, to the heated salt solution, while stirring and maintaining the temperature at 70° to 80° C. Upon completion of the slurry addition, flood with cold water to 55° C. Then add a solution of 120 parts of water and 12 parts of barium chloride ($BaCl_2.2H_2O$). Heat at the boiling temperature for 10 minutes, and flood with cold water to a temperature of 70° C. Add 12 parts of barium chloride ($BaCl_2.2H_2O$) dissolved in 120 parts water. Stir for a short time, filter, do not wash, and dry. 20 parts of such pigment are readily ground into 24 parts of No. 0 regular litho varnish to make an improved ink.

*Discussion.*—The last addition of barium chloride is for the purpose of introducing salt electrolyte. The failure to wash is for the purpose of retaining a portion of this and other salt electrolyte, largely sodium chloride, present in the suspending liquid which is largely filtered away.

It is to be observed that the above example provides a pigment having present a water-insoluble metallic soap of a rosinic acid and a water-insoluble metallic soap of a fatty type acid. A pigment having this combination of soaps, rather than but one of such soaps, is of itself improved for the purpose of making inks, and it is of itself subject to further improvement by the presence of the salt electrolyte. The effectiveness of salt electrolyte to give improved inks, is greatly enhanced by the presence of a combination of soaps, one of which is derived from a rosinic soap-forming acid, and the other of which is derived from a fatty type soap-forming acid. Salt electrolyte in the pigment results in better wetting when incorporating the pigment and soap into a vehicle. It also produces coating compositions having increased flow and, in the case of certain inks, gives improved lithographic breakdown resistance.

Example 3

This example is in part taken from my cofiled application Serial No. 479,494, referred to above.

GRAPHIC RED PIGMENT—*The barium salt of the coupling of 2-naphthylamine-1-sulfonic acid with 2-naphthol. See Schultz, "Farbstofftabellen" (1931), No. 219.*—To an agitated solution at 90° C. produced from 450 parts of water; 6.0 parts of WW wood rosin, as the sodium salt in a 10% solution in water; 6.0 parts of the condensation product of about 1 part of maleic anhydride and 6.8 parts of E wood rosin, as the sodium salt in a 10% solution in water; and 6.0 parts of crude naphthenic acids, as the sodium salts in a 10% solution in water, add 10.5 parts of barium chloride ($BaCl_2.2H_2O$) dissolved in 200 parts of water. After 15 minutes agitation, while having attained and maintained the temperature at 90° C., filter off the resulting water-insoluble metallic soap. Wash free of salt electrolyte, dry, and grind to a powder. For convenience, this soap is designated "soap A."

The preparation of soap A is repeated, save that the 10.5 parts of barium chloride ($BaCl_2.2H_2O$) are increased to 14.0 parts to provide additional salt electrolyte, and no washing is practiced after the filtration. For convenience, this soap is designated as "soap B."

Soap B, in appearance, closely resembles that of soap A. It differs, however, in that adhering or occluded salt electrolyte is present, both as a result of eliminating the washing step and also due to an increase in the amount of the barium chloride.

By conventional methods a coating composition is prepared from the following ingredients:

| | Parts by weight |
|---|---|
| Barium graphic pigment | 17 |
| Soap A | 3 |
| No. 0 regular litho varnish | 24 |

This ink is for convenience designated "ink C."

Another coating composition is similarly prepared, except that soap A is replaced by soap B. This ink is for convenience designated "ink D."

A comparison of ink C with ink D shows that ink D is softer in body, has greater flow, is better dispersed, and shows greater resistance to emulsification with water.

Instead of the salt electrolyte being associated with the soap powder, it may be associated with the pigment, preferably during the pigment formation or conditioning process, or, if desired, at any time prior to, or even after, the final drying of the pigment. For example, the salt electrolyte necessarily present after formation of the original strike of an azo pigment dyestuff, may be retained with the pigment through the conditioning and final recovery steps by omitting the customary washing step prior to drying. This salt electrolyte may be supplemented by the addition of more salt electrolyte any time prior to, or even after, the final drying; or the originally present salt electrolyte may be removed by washing the conditioned pigment, and the washed pigment may be treated with additional salt electrolyte, either before or after drying. Alternatively, part of the salt electrolyte may be associated with the dry pigment and part with the soap powder at the most convenient stages prior to mixing the latter with the former, where a new dry pigment composition is desired.

Example 4

GRAPHIC RED PIGMENT—*Barium salt of the coupling of 2-naphthylamine-1-sulfonic acid with 2-naphthol. (See Schultz, "Farbstofftabellen" (1931), No. 219).*—Into 300 parts of water, place 8.5 parts of sodium hydroxide, and 43.9 parts of 2-naphthylamine-1-sulfonic acid (98.5% purity). With gentle warming, stir to solution. Cool to 0° C. by means of an ice addition. Then add 57 parts of 28% by weight hydrochloric acid. Diazotize at 0° to 2° C. with 13.8 parts of sodium nitrite to prepare a diazo. Separately dissolve 1.2 parts of sodium carbonate (anhydrous) in 150 parts of water, and to this add a solution of 225 parts of water, 8.9 parts of sodium hydroxide, and 27.9 parts of 2-naphthol to form the alkaline color-component solution. With the latter at 20° C., add to it the prepared diazo, thus striking the dyestuff, which is now present as the acid form in the presence of sodium ion in a medium at about 13° C. This is referred to as "the strike."

To the strike at 13° C., add 21.6 parts of WW wood rosin, as the sodium salt in a 10% aqueous solution. Then dilute with cold water to a 100% volume increase.

Separately prepare a solution at 70° to 80° C. of 1800 parts of water and 17.8 parts of barium chloride ($BaCl_2.2H_2O$). Add the soap-containing strike slowly, as required, to the heated salt solution, while stirring and maintaining the temperature at 70° to 80° C. Upon completion of the slurry addition, flood with cold water to 55° C. Then add a solution of 120 parts of water and 12 parts of barium chloride ($BaCl_2.2H_2O$). Heat at the boiling temperature for 10 minutes, and flood with cold water to a temperature of 70° C. Add 12 parts of barium chloride ($BaCl_2.2H_2O$) dissolved in 120 parts of water. Stir for a short time, filter, thoroughly wash, and then dry. The pigment product at this stage is for convenience designated "pigment C." 20 parts of such pigment are readily ground into 24 parts of No. 0 regular litho varnish to make an ink.

If the slurry from above is processed without any washing prior to drying, as was performed in producing pigment C, and then dried and ground, a pigment is obtained containing some salt electrolyte. For convenience this pigment is designated "pigment D." 20 parts of this pigment are readily ground into 24 parts of No. 0 regular litho varnish to make an ink.

The ink secured from pigment D, when compared with an ink secured from pigment C, shows somewhat better softness and length of ink body.

This example illustrates the use of salt electrolyte with an azo pigment dyestuff lake containing a single water-insoluble metallic soap. The improvements here are not as great as in Examples 1 to 3. However, they are advantageous and demonstrate that the advantage of using salt electrolyte is not confined to pigments associated with a mixture of the soaps of the types disclosed in my copending applications discussed above, and inhere in the combination of salt electrolyte and any water-insoluble metallic soap, when both are present with any azo pigment dyestuff.

The manufacture of an azo pigment dyestuff of high tinctorial value is dependent upon numerous factors, as those skilled in the art are aware. For example, in the Graphic Red type of azo pigment dyestuffs, the nature of the Tobias acid, the particular isomers in this Tobias acid, and the coupling and conversion conditions, all come into consideration. Likewise, these factors affect to some extent the physical form of the completed pigment dyestuff.

It has been found that, under certain conditions, the presence of salt electrolyte with an azo pigment dyestuff containing no soap extender of any kind tends to give slightly improved wetting of a pigment by a vehicle, as well as slightly beneficial flow properties of the finished coating composition. The improvements here, however, are of a very small order compared to the improvements resulting from the additional presence of water-insoluble metallic soap.

In the foregoing examples, the salt ingredient used to provide additional salt electrolyte was barium chloride. However, it is to be understood that the nature of the salt used for this purpose may vary widely within the definition of salt electrolyte given herein and that, even in the above examples, other salts than barium chloride are necessarily present in the final product. In Example 1, for instance, the soluble salts present in the suspending liquid after precipitation of the insoluble soaps consist of salt formed during the coupling reaction in forming the initial pigment compound, salt formed in converting the pigment from a relatively insoluble form to a still more insoluble and stable calcium salt form, and salt formed in precipitating the insoluble soaps, as well as excess barium chloride used as the soap-precipitating salt. Similarly, in Example 2, the soluble salts present in the suspending liquid, after precipitation of the pigment and soaps, may consist of salt formed during the coupling reaction in forming a pigment compound and salt formed in precipitating the pigment and the soaps, as well as excess barium chloride. In both of these examples, the salt electrolyte may be provided merely by adding an excess of the water-soluble salt used to precipitate either the pigment, or the soaps, or both.

Obviously, not all of the salt electrolyte present in the aqueous slurry of the soaped pigments of Examples 1 and 2, or present with the precipitated soap B of Example 3 prior to filtering, is retained with the pigment by not washing it. The amount retained may be diminished or increased as conditions may require by control of the separation from the liquid, or by a controlled partial washing, or increased by the addition of salt electrolyte at any time up to incorporation of the pigment into the vehicle. In the dry process, the salt electrolyte may be added to the wet soap before drying, or it may be added in powdered form to the finished soap product, though such additions are not preferred.

With respect to the dry process of Example 3, it has been found that cation salts, other than the alkali-metal type, tend to react unfavorably under certain conditions in the presence of certain alkali metal salt forms of azo pigment dyestuffs. In general, advantageous and adaptable use of salt electrolyte having such cations in the soap powders, is made with azo pigment dyestuffs other than the alkali metal salt-forms.

I have given above a number of examples involving various manipulations with and without the step of retaining salt electrolyte with the pigment, or with the soap with which the pigment is associated. The fundamental chemistry involved in forming the pigments has not been changed where salt electrolyte has been retained, but variations of the final steps of the recovery procedure of either the pigment or the soap are so made that the physical properties of the salt-electrolyte-soap-pigment compositions, when incorporated into a vehicle, are improved. In particular, the surface of the pigment particles is believed to be so modified that it presents new properties, whereby the interfacial relation of solid (pigment) to liquid (vehicle) has been changed to a more favorable one. Thus, the new pigment compositions present improved grinding and wetting properties toward numerous vehicles commonly employed in the industry. Besides affecting the physical chemistry of the pigments in a manner such as has just been described, salt electrolyte in the presence of water-insoluble metallic soap has been shown to effect greater emulsion inhibition in azo pigment dyestuff inks, that are used for the wet lithographic process.

While I have briefly referred to a theory explaining in part the nature of the physical changes occurring in the behavior of the new azo pigment dyestuff compositions when incorporated into a vehicle, I intend in no way to suggest that such explanation constitutes any limit upon the scope of my invention. Likewise, the examples which I have given to illustrate several different practical applications of the present invention are not intended to be construed as limitations. Numerous procedures for making azo pigment dyestuff coating compositions in which my invention may be readily applied will be apparent to one skilled in the art.

This application is a continuation in part of my copending applications, Serial Nos. 348,687 to 348,690 inclusive, all filed July 31, 1940; and Serial Nos. 427,919 and 427,920, both filed January 23, 1942. This application is also generic to my cofiled applications, Serial Nos. 479,493, 479,494, 479,495, 479,496, 479,498, and 479,499.

What I claim as my invention and desire to secure by Letters Patent is:

1. The method of making a coating composition which comprises simultaneously dispersing azo pigment dyestuff, water-insoluble metallic soap, and a small amount of salt electrolyte into a non-aqueous liquid vehicle.

2. The method of making a coating composition which comprises simultaneously dispersing into a non-aqueous liquid vehicle dry materials comprising essentially azo pigment dyestuff, water-insoluble metallic soap, and a small amount of salt electrolyte.

3. In the manufacture of azo pigment dyestuff coating compositions, the improvement which comprises associating a small amount of salt electrolyte, water-insoluble metallic soap, and azo pigment dyestuff, and incorporating the resulting composition into a non-aqueous liquid vehicle.

4. In the manufacture of an azo pigment dyestuff composition containing water-insoluble metallic soap and being suitable for incorporation into a non-aqueous liquid vehicle to make a coating composition, the improvement which comprises associating and retaining a small amount of salt electrolyte with said composition.

5. The process of manufacturing an azo pigment dyestuff composition which comprises associating water-insoluble metallic soap with azo pigment dyestuff in a suspending liquid containing dissolved salt electrolyte, and separating the resulting pigment-soap composition from the major part of the suspending liquid while retaining a minor portion thereof sufficient to provide a small amount of said dissolved salt electrolyte in the said pigment-soap composition.

6. The process of manufacturing an azo pigment dyestuff composition which comprises associating water-insoluble metallic soap with azo pigment dyestuff in a suspending liquid containing dissolved salt electrolyte, separating the resulting pigment-soap composition from the major part of the suspending liquid while retaining a minor portion of said liquid, and drying the said composition without washing, whereby a small amount of salt electrolyte is retained therewith.

7. The process of manufacturing an azo pigment dyestuff composition which comprises forming water-insoluble metallic soap in dry powdered form, separately forming an azo pigment dyestuff in dry powdered form, physically associating a small amount of salt electrolyte with at least one of said materials during its formation and retaining it therewith, and mixing together the powdered pigment and the powdered soap.

8. The process of manufacturing an azo pigment dyestuff composition which comprises forming water-insoluble metallic soap in dry powdered form while physically associating and retaining a small amount of salt electrolyte therewith, separately forming an azo pigment dyestuff in dry powdered form, and mixing the powdered pigment with the powdered soap and associated salt electrolyte.

9. The process of manufacturing an azo pigment dyestuff composition which comprises forming water-insoluble metallic soap in dry powdered form, separately forming an azo pigment dyestuff in dry powdered form while physically associating and retaining a small amount of salt electrolyte therewith, and mixing the powdered soap with the powdered pigment and associated salt electrolyte.

10. The process of manufacturing azo pigment dyestuff coating compositions which comprises associating azo pigment dyestuff and water-insoluble metallic soap in a suspending liquid containing dissolved salt electrolyte, separating the azo pigment dyestuff and water-insoluble soap from the suspending liquid in such manner as to retain a small amount of the salt electrolyte with the pigment and soap, and incorporating the pigment, soap, and the retained salt electrolyte into a non-aqueous liquid vehicle.

11. In the process of manufacturing azo pigment dyestuff coating compositions containing azo pigment dyestuff, water-insoluble metallic soap, and salt electrolyte, the improvement which comprises associating the pigment and the soap in a suspending liquid containing dissolved salt electrolyte, separating the suspended materials from the major portion of said liquid while retaining a minor portion of said liquid, drying the separated material, whereby a small amount of salt electrolyte is associated therewith, and incorporating the resulting dried material carrying the associated salt electrolyte into a non-aqueous liquid vehicle.

12. The process of manufacturing azo pigment dyestuff coating compositions which comprises incorporating into a non-aqueous liquid vehicle a dry powdered mixture of azo pigment dyestuff, water-insoluble metallic soap, and a small amount of salt electrolyte.

13. The process of manufacturing azo pigment dyestuff coating compositions which comprises incorporating into a non-aqueous liquid vehicle a dry powdered mixture of azo pigment dyestuff, water-insoluble metallic soap, and a small amount of salt electrolyte, said salt electrolyte having been intimately associated with at least one of the other two constituents of the powdered mixture during its preparation and prior to mixing the said two constituents.

14. The process of manufacturing azo pigment dyestuff coating compositions which comprises forming water-insoluble metallic soap in dry powdered form, separately forming an azo pigment dyestuff in dry powdered form, physically associating a small amount of salt electrolyte with at least one of said powdered materials during its formation and retaining it therewith, mixing together the powdered pigment and the powdered soap whereby salt electrolyte is included in the resulting mixture, and incorporating said mixture into a non-aqueous liquid vehicle.

15. A pigment composition comprising in intimate association azo pigment dyestuff, water-insoluble metallic soap, and a small amount of salt electrolyte.

16. A pigment composition comprising azo pigment dyestuff, water-insoluble metallic soap, and a small amount of salt electrolyte, all intimately associated together by the process of claim 5.

17. A dry pigment composition comprising azo pigment dyestuff, water-insoluble metallic soap, and a small amount of salt electrolyte, all intimately associated together by the process of claim 6.

18. An azo pigment dyestuff composition comprising azo pigment dyestuff, water-insoluble metallic soap, and a small amount of salt electrolyte, all associated together in dry powdered form by the process of claim 7.

19. A coating composition comprising a non-aqueous liquid vehicle, and dispersed therein: azo pigment dyestuff, water-insoluble metallic soap, and a small amount of salt electrolyte, associated together prior to dispersion in said vehicle.

20. A coating composition comprising a non-aqueous liquid vehicle having incorporated therein an azo pigment dyestuff composition prepared by the process of claim 5, and comprising azo pigment dyestuff, water-insoluble metallic soap, and a small amount of salt electrolyte.

21. A coating composition comprising a non-aqueous liquid vehicle having incorporated therein an azo pigment dyestuff composition prepared by the process of claim 6, and comprising azo pigment dyestuff, water-insoluble metallic soap, and a small amount of salt electrolyte.

22. A coating composition comprising a non-aqueous liquid vehicle having incorporated therein an azo pigment dyestuff composition prepared by the process of claim 7, and comprising azo pigment dyestuff, water-insoluble metallic soap, and a small amount of salt electrolyte.

GRADY M. O'NEAL.

CERTIFICATE OF CORRECTION.

Patent No. 2,350,524. June 6, 1944.

GRADY M. O'NEAL.

It is hereby certified that error appears in the printed specification of the above numbered patent requiring correction as follows: Page 1, second column, line 32, for "present" read --apparent--; page 2, second column, line 13, for "said" read --salt--; and that the said Letters Patent should be read with this correction therein that the same may conform to the record of the case in the Patent Office.

Signed and sealed this 29th day of August, A. D. 1944.

Leslie Frazer (Seal) Acting Commissioner of Patents.